United States Patent [19]
Dooley

[11] Patent Number: 5,226,525
[45] Date of Patent: Jul. 13, 1993

[54] CONVEYOR RACK SYSTEM

[76] Inventor: Richard A. Dooley, 400 S. Westwood Ave., Toledo, Ohio 43609

[21] Appl. No.: 965,866

[22] Filed: Oct. 23, 1992

[51] Int. Cl.$^5$ .............................................. B65G 17/32
[52] U.S. Cl. ................................ 198/680; 198/485.1; 105/149
[58] Field of Search .................. 198/377, 465.4, 475.1, 198/474.1, 485.1, 486.1, 680; 105/149, 149.1, 149.2

[56] References Cited

U.S. PATENT DOCUMENTS

| | | | |
|---|---|---|---|
| 2,783,962 | 3/1957 | Lyon | 198/486.1 |
| 2,821,289 | 1/1958 | Castagnoli et al. | 198/680 |
| 5,000,309 | 3/1991 | Dooley | 198/680 |

FOREIGN PATENT DOCUMENTS 947010  8/1982  U.S.S.R. .............................. 198/680

Primary Examiner—D. Glenn Dayoan
Attorney, Agent, or Firm—Allen D. Gutchess, Jr.

[57] ABSTRACT

A conveyor has an overhead conveyor rail with a horizontal portion and an angled portion. A receptacle is carried by supports below the rail with the receptacle positioned transversely to the rail. A two-piece rack hanger has an upper part with an upper angular end portion received in the receptacle. The hanger has a lower part affixed to a rack for parts or articles and a pivot connects the lower part and the upper part of the hanger. Stops are associated with the receptacle and upper angular end portion of the hanger to limit transverse movement of the racks as they move on the angled portion of the conveyor. When the racks reach a limited transverse position, they are held in horizontal dispositions by the pivots between the lower and upper parts of the hanger.

19 Claims, 2 Drawing Sheets

CONVEYOR RACK SYSTEM

This invention relates to a conveyor with part-carrying racks which move to predetermined transverse positions when the racks are below angled portions of the conveyor and then pivot to maintain horizontal dispositions.

The conveyor can be of the monorail type which moves racks or frames of parts or articles supported below the rail along a predetermined path. The path typically extends through cleaning and/or printing and baking operations for the parts. Since the parts are usually cleaned or coated from both sides, the part racks must be positioned parallel to the path along which they move so that opposite surfaces of the parts can be equally treated from both sides.

In most instances, the monorail conveyors move the parts along angular portions of the path as well as horizontal ones when the parts are moved between floors or different levels of operation. When the parts move along the angled portions of the path, the racks must not touch one another, which, of necessity, requires that the racks be spaced apart a substantial distance when on the horizontal portions of the predetermined path. Heretofore, to avoid contact of adjacent racks during forty-five degree ascending and descending portions of the path, for example, the racks typically were spaced apart on the horizontal portions of the path a distance equal to one and one-half times the rack width.

The unique conveyor design disclosed in my U.S. Pat. No. 5,000,309, issued Mar. 19, 1991, causes the part racks or frames to automatically rotate about upright axes between positions in which they are parallel to the predetermined path when the racks are below horizontal portions of a rail of the conveyor to positions in which they are transverse to the path when the racks are below angled, ascending or descending, portions of the conveyor rail. Consequently, the racks can be almost in contact when positioned parallel to the predetermined path and below the horizontal portion of the conveyor rail. Therefore, a substantially continuous wall of parts can be presented as they pass through cleaning, painting and baking operations, for example. The throughput capacity of an existing operation including a monorail conveyor having typically forty-five degree ascending and descending portions can be increased substantially fifty percent, maintaining the same processing cycle times and changing only the feed rates of coating materials applied to the parts. The conveyor design also enables the racks or frames to be more accurately positioned parallel to the direction of the predetermined path along which they move, which is important when precise spacing between the parts and spray gun nozzles, for example, is required for uniform coating or finishing.

A conveyor in accordance with the invention includes an overhead rail having at least one generally horizontal portion and one angled portion which carries the parts along ascending or descending portions of a predetermined path. The overhead rail typically has roller chains below which hooks extend. A link or bar is pivotally connected to two hooks and carries an elongate receptacle or socket having an axis lying in a plane which is perpendicular to both the conveyor rail and the path along which the articles are moved. The axis of the receptacle also is positioned to form a predetermined pivot angle relative to an intersecting horizontal line which lies in that plane when the receptacle is below a horizontal portion of the conveyor rail.

In accordance with the invention, the conveyor also has a two-piece rack hanger with a pivot therebetween. The rack hanger suspends an article rack or frame below the conveyor rail. The upper part of the rack hanger has an elongate upright portion which is straight and an angular end portion forming an acute angle with a vertical intersecting line, this angle being complementary to the angle which the receptacle axis forms with its horizontal line, the two angles substantially equalling ninety degrees.

The upper end portion and the receptacle in which it is received have cooperating stops which limit the extent of the transverse movement of the racks as they reach an angled portion of the conveyor. After the rack reaches the desired transverse position as determined by the stops, the pivot of the rack hanger then enables the rack to maintain a horizontal disposition as it further ascends or descends the angled portion of the conveyor.

The transverse movement of the racks is achieved in the same manner disclosed in my U.S. Pat. No. 5,000,309. When the hangers are moved to a position below the angled portion of the rail, the axis of the elongate receptacle continues to lie in a plane which is perpendicular to both the conveyor rail and the predetermined path of the parts and continues to form the same pivot angle with an intersecting horizontal line which lies in that plane. The axis of the upper angular portion of the hanger remains in alignment or coaxial with the axis of the receptacle. However, the upright portion of the hanger remains substantially vertical under the force of gravity with the result that the upper angular portion of the hanger turns in the receptacle. Consequently, the upright portion turns relative to the path of predetermined movement of the parts with the result that the rack, which has been parallel to the direction of movement of the parts, now is turned transversely to the direction of movement. With this arrangement, the racks are automatically turned transversely to the path of the racks as they ascend or descend the angled portions of the conveyor rail. This is accomplished without the need for any special cams, gears or the like to cause such rotation of the racks.

The transverse movement is limited by the aforementioned stops. These can be in the form of elongate bars affixed to the receptacle and extending beyond the end thereof and a pin on the angular portion of the upper part of the conveyor which engages the stops to determine the maximum transverse movement of the rack.

After the transverse movement of the rack is stopped, which is early on the angled portion of the conveyor rail, the elongate upright portion of the upper part of the rack hanger then assumes an angle to the vertical and is no longer upright as the racks continue to move up or down the angled portion of the conveyor rail. To maintain the horizontal disposition of the rack, the pivot then enables the rack and the lower part of the rack hanger to maintain position, with the lower part of the hanger remaining vertical even though the elongate upright portion of the upper part of the rack is no longer in a vertical position.

By limiting the degree of transverse movement of the racks, they stay closer to the plane of the monorail and thereby will not interfere with physical objects adjacent the rail which could otherwise occur if long or wide racks are employed which move to more extreme transverse positions.

It is, therefore, a principal object of the invention to provide a conveyor for racks of parts which causes the racks to turn transversely to their path of movement to predetermined transverse positions when the racks are carried along ascending or descending paths.

Another object of the invention is to provide a conveyor which moves racks to predetermined transverse positions and yet maintains their position relative to the horizontal when the racks are moved along ascending or descending paths.

Many other objects and advantages of the invention will be apparent from the following detailed description of a preferred embodiment thereof, reference being made to the accompanying drawings, in which.

Figure 1:
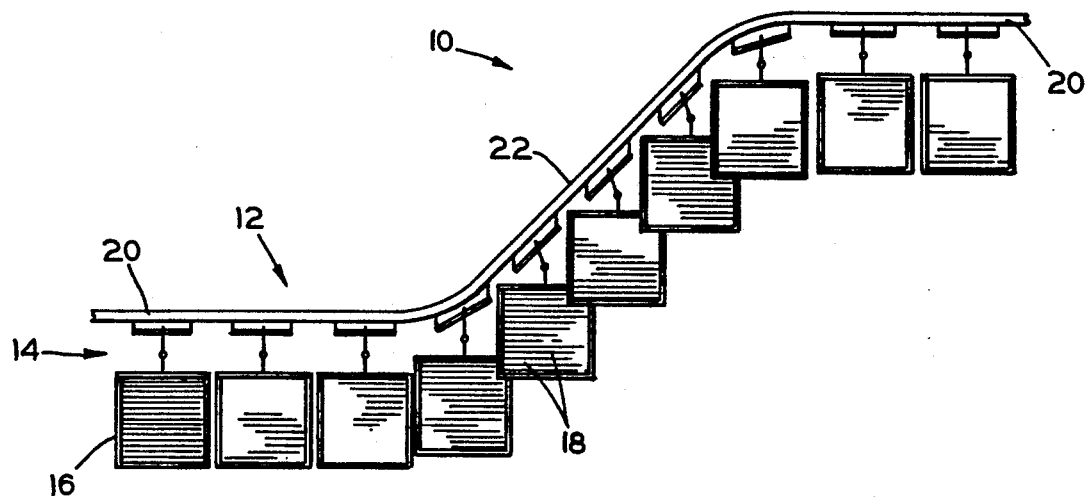
FIG. 1 is a schematic view in elevation of a conveyor in accordance with the invention.
Figure 2:
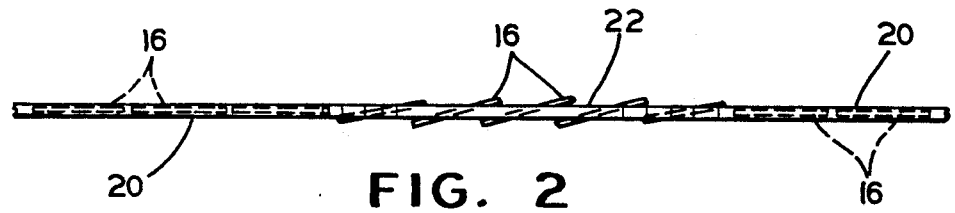
FIG. 2 is a schematic plan view of the conveyor of FIG. 1.

Referring to FIGS. 1 and 2, a conveyor embodying the invention is indicated at 10 and includes an overhead monorail 12 and rack support assemblies 14 for carrying racks or frames 16 for parts or articles 18. The rail 12 has horizontal portions 20 and angled portions 22, one being shown. Operations on the parts, such as cleaning, coating, and baking, are usually performed along the horizontal portions 20 of the monorail 12 and the parts 18 and racks 16 are moved between different levels or floors along the angled portions 22. The racks 16 must be parallel to their movement along a predetermined path, as determined by the monorail 12, when they are on the horizontal portions 20 thereof. In this manner, the parts 18 can be sprayed, etc. equally from both sides. Heretofore, the racks 16 had to be spaced apart a sufficient distance that the edges did not contact one another when they were on the angled portion of the conveyor. However, when the racks are turned transversely on the angled portion 22, they can be virtually in contact when on the horizontal portions 20. This close spacing has a number of advantages as discussed previously.

Figure 3:
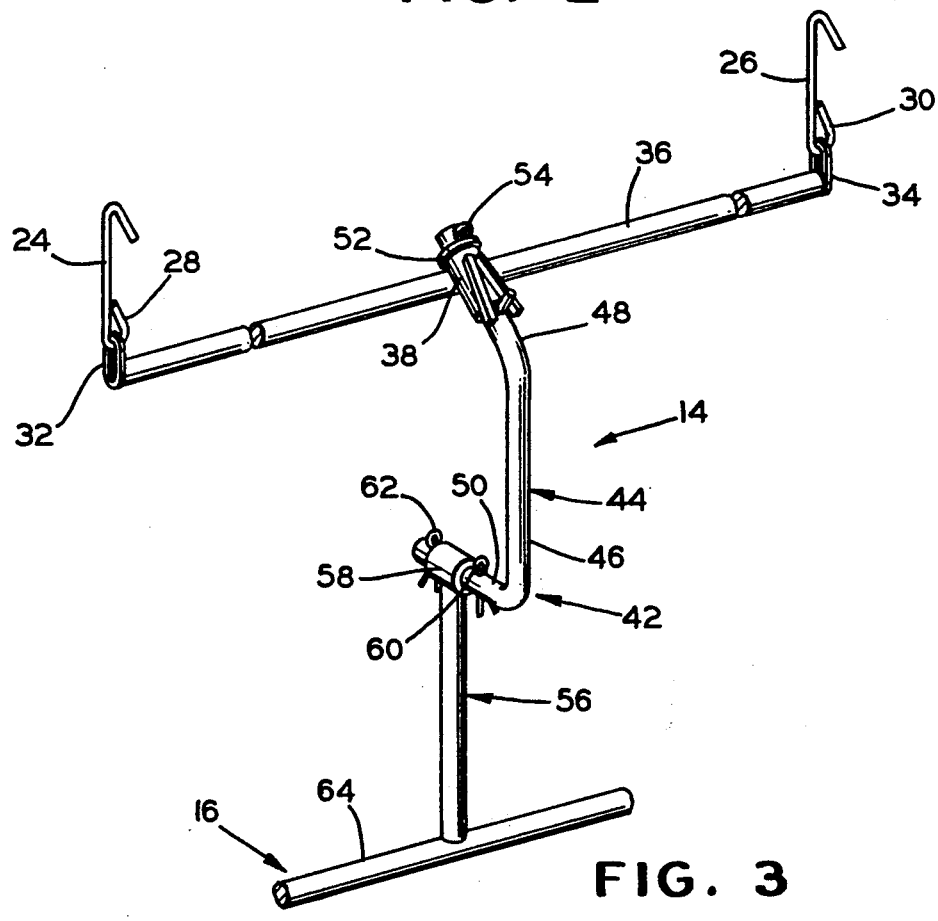
FIG. 3 is a fragmentary view in perspective of a rack support assembly in accordance with the invention.
Figure 4:
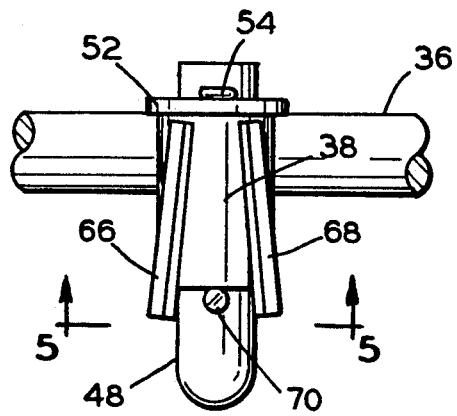
FIG. 4 is an enlarged top view of the rack support assembly of FIG. 3.
Figure 5:
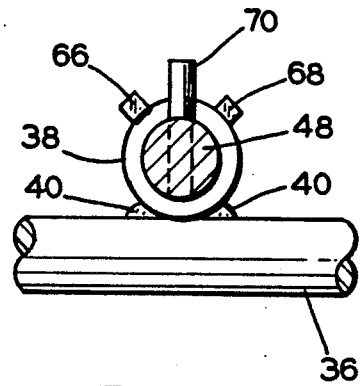
FIG. 5 is a view in transverse cross section taken along the line 5—5 of FIG. 4.

One of the rack support assemblies 14 is shown in FIGS. 3-7. Referring to FIG. 3, the support assembly includes two hooks 24 and 26 which engage a roller chain (not shown) carried by the monorail 12 and move along the monorail with the chain, which is powered by suitable drive means located in a suitable location along the monorail, as is well known in the art. The hooks 24 and 26 have lower loops 28 and 30 which extend through rings 32 and 34 which are suitably affixed, as by welding, to the ends of a link or bar 36. An elongate receptacle or socket 38 is affixed to a central portion of the link 36 at a predetermined angle as by welds 40 (FIG. 5). The receptacle 38 has an axis lying in a plane which is perpendicular to both the conveyor rail 12 and the predetermined path along which the racks are moved. The axis of the receptacle also is positioned to form a predetermined pivot angle relative to an intersecting horizontal or vertical line which is perpendicular to the rail and path. The pivot angle can be changed according to the slope of the angled portion 22 and the size and shape of the rack and parts but is always greater than zero.

A two-piece rack hanger 42 is located below the link 36. The hanger includes an upper part 44 which includes an elongate upright portion 46, an upper angular end portion 48, and a lower horizontal portion 50. The angular end portion 48 extends through the receptacle 38 and is held therein by suitable means such as a washer 52 and a cotter pin 54. The angular end portion 48 forms the same pivot angle with a horizontal line as the axis of the receptacle 38. A lower part 56 of the hanger 42 has an upper tubular member or cylinder 58 affixed thereto through which the horizontal portion 50 of the upper hanger part 44 extends, being limited in lineal movement by suitable means such as cotter pins 60 and 62. The lower end of the lower hanger part 56 is affixed to a central portion of an upper frame member 64 of the rack 16.

As the rack support assembly 14 and the rack 16 begin to move up or down the angled portion 22 of the conveyor rail, the rack hanger 42 and the rack 16 turn to move the rack to a transverse position, as described previously. With wide racks and narrow parts, a transverse movement of only ten to fifteen degrees is all that is necessary for the racks and parts to clear one another when travelling up or down the angled portion 22. The parts 18, by way of example, can be long trim strips to be coated. In many instances, greater transverse movement of the racks is immaterial. However, particularly with wider racks, excess transverse movement can cause the racks to interfere with physical objects adjacent the rail or with the edges of openings in ceilings or floors through which the racks move on the conveyor.

Figure 6:
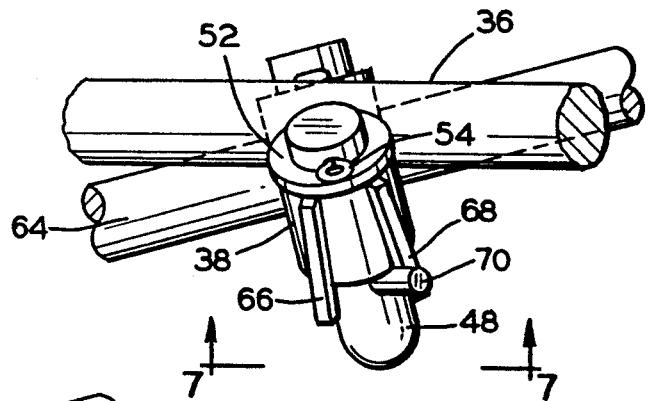
FIG. 6 is a view similar to FIG. 4 but showing the components in different positions.
Figure 7:
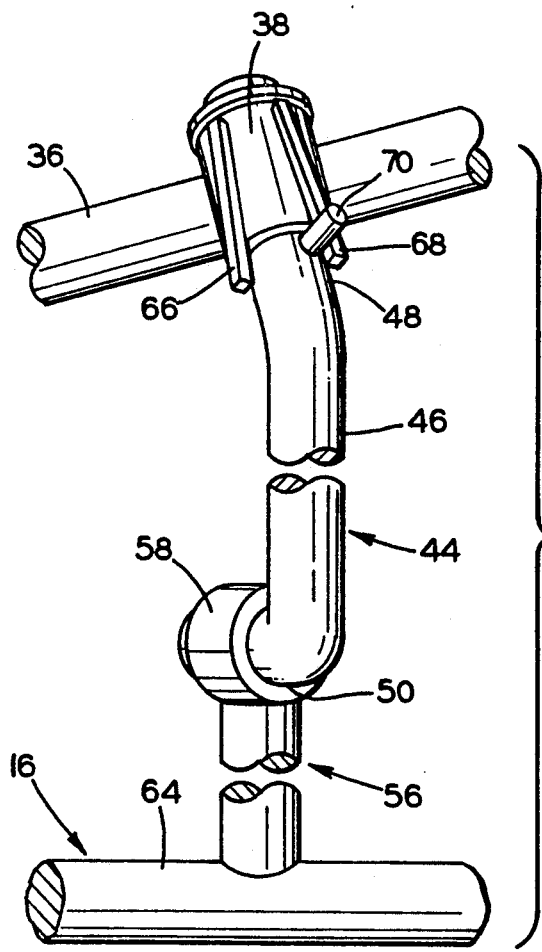
FIG. 7 is a view in elevation taken along the line 7—7 of FIG. 6.

To limit the transverse movement of the racks 16, stop means are provided for the rack hanger 42. For this purpose, referring particularly to FIGS. 4-7, two stop bars 66 and 68 are affixed to the outer surface of the receptacle 38 and extend beyond the lower edge thereof. A stop pin 70 is affixed to and extends from the angled portion 48 of the upper part 44 of the hanger 42 and is adjacent the lower edge of the receptacle 38. The pin moves between the stop bars 66 and 68 as the hanger 42 pivots to move the rack 16 transversely. The maximum transverse movement of the rack is determined when the pin 70 contacts one of the bars 66 and 68. FIGS. 6 and 7 show the frame member 64 of the rack 16 in its maximum transverse position which is reached when the rack support assembly 14 and the rack 16 begin movement up the angled portion 22 of the conveyor. This transverse position is sufficient for the wide rack 16 with the narrow parts 18 to clear one another on the angled portion of the conveyor, as shown in FIGS. 1 and 2.

As the support assemblies 14 and the rack 16 reach the full angular disposition of the angled portion 22 of the conveyor, with the racks in their maximum transverse position, the pivot achieved by the horizontal portion 50 of the upper part 44 and the cylinder 58 enables the lower part 56 of the hanger 42 and the rack 16 to maintain the same position as when below the horizontal portions 20 of the conveyor, with the lower part 56 of the hanger being vertical and the rack 16 remaining in a horizontal disposition. When the hanger assemblies and racks reach the upper end of the angled portion 22, the racks then move back to the coplanar relationship as shown in FIGS. 1 and 2 with the pins 70 being centrally located between the stop bars 66 and 68 again as shown in FIGS. 4 and 5.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A conveyor comprising an overhead conveyor rail having a generally horizontal portion and an angled portion, a generally cylindrical receptacle, support means movably carried below said rail and positioning said receptacle transversely to said rail with an axis of said receptacle forming a pivot angle with an intersecting horizontal line which is perpendicular to the rail, a rack hanger having an upper part with an upper angular end portion received in said receptacle for rotational movement with respect thereto, said hanger having a lower part with a lower end affixed to a rack, stop means associated with said receptacle and said upper part of said hanger for limiting transverse movement of said rack, and pivot means pivotally connecting an upper end portion of said lower part and a lower end portion of said upper part.

2. A conveyor according to claim 1 wherein said stop means comprises two stop bars extending downwardly from said receptacle and a pin extending outwardly from said angular portion of said upper part between said stop bars.

3. A conveyor according to claim 1 wherein said pivot means comprises a horizontal portion on one of said upper and lower parts and a tubular member affixed to the other of said upper and lower parts and receiving said horizontal portion.

4. A conveyor according to claim 1 wherein said pivot means comprises a horizontal portion on said upper part and a tubular member affixed to said lower part and receiving said horizontal portion.

5. A conveyor according to claim 1 wherein said upper angular end portion is received in said receptacle through a lower end thereof.

6. A conveyor according to claim 5 wherein said upper angular end portion extends through said receptacle and means are carried by said angular end portion to retain said angular end portion in said receptacle.

7. A conveyor comprising an overhead conveyor rail having a generally horizontal portion and an angled portion, first hook means movably carried below said rail, second hook means movably carried below said rail, a link connected to said first and second hook means, said first and second hook means and said link being movable in a linear path below said rail, a receptacle carried by said link between said first and second hook means and positioned transversely to the direction of movement of said link, said receptacle having an axis forming a pivot angle with a horizontal intersecting line which is perpendicular to the rail, a rack hanger having an upper part with an upper angular end portion received in said receptacle for rotational movement with respect thereto, stop means associated with said receptacle and said upper angular end portion of said hanger for limiting rotational movement of said hanger, said hanger having a lower part to be affixed to a rack, and pivot means pivotally connecting said lower part and said upper part of said rack hanger.

8. A conveyor according to claim 7 wherein said stop means comprises two stop bars extending downwardly from said receptacle and a pin extending outwardly from said angular portion of said upper part between said stop bars.

9. A conveyor according to claim 7 wherein said pivot means comprises a horizontal portion on one of said upper and lower parts and a tubular member affixed to the other of said upper and lower parts and receiving said horizontal portion.

10. A conveyor according to claim 7 wherein said pivot means comprises a horizontal portion on said upper part and a tubular member affixed to said lower part and receiving said horizontal portion.

11. A conveyor according to claim 7 wherein said upper angular end portion is received in said receptacle through a lower end thereof.

12. A conveyor according to claim 11 wherein said upper angular end portion extends through said receptacle and means are carried by said angular end portion to retain said angular end portion in said receptacle.

13. A conveyor comprising an overhead conveyor rail having a generally horizontal portion and an angled portion, a receptacle, support means movably carried below said rail and positioning said receptacle transversely to said rail with an axis of said receptacle forming an angle greater than zero with an intersecting horizontal line, a two-piece rack hanger having an upper part and a lower part with the upper part having an angular end portion received in said receptacle for rotational movement with respect thereto, stop means associated with said receptacle and said upper angular end portion for limiting rotational movement of said hanger, and pivot means pivotally connecting an upper end portion of said lower part and a lower end portion of said upper part.

14. A conveyor according to claim 13 wherein said support means comprises two hooks, a link connecting said hooks, and said receptacle is affixed to an intermediate portion of said link.

15. A conveyor according to claim 13 wherein said stop means comprises two stop bars extending downwardly from said receptacle and a pin extending outwardly from said angular portion of said upper part between said stop bars.

16. A conveyor according to claim 13 wherein said pivot means comprises a horizontal portion on one of said upper and lower parts and a tubular member affixed to the other of said upper and lower parts and receiving said horizontal portion.

17. A conveyor according to claim 13 wherein said pivot means comprises a horizontal portion on said upper part and a tubular member affixed to said lower part and receiving said horizontal portion.

18. A conveyor according to claim 13 wherein said upper angular end portion is received in said receptacle through a lower end thereof.

19. A conveyor according to claim 18 wherein said upper angular end portion extends through said receptacle and means are carried by said angular end portion to retain said angular end portion in said receptacle.

* * * * *